June 20, 1967   S. PINCUS ETAL   3,325,861
MOLD FOR CASTING POLYURETHANE ARTICLES
Filed April 2, 1964
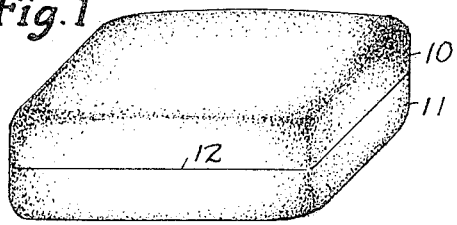
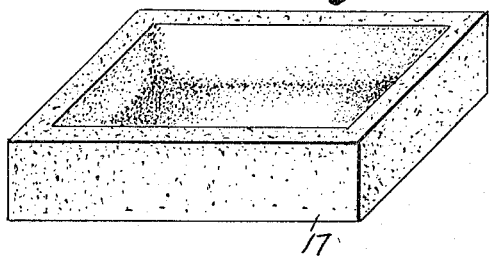
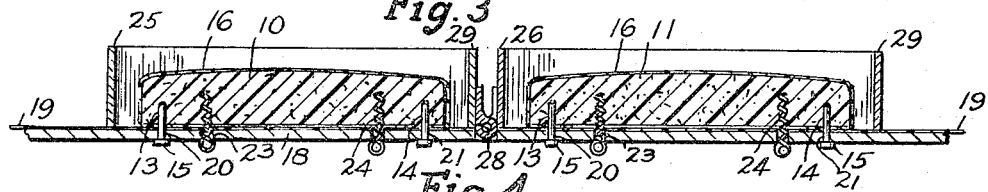
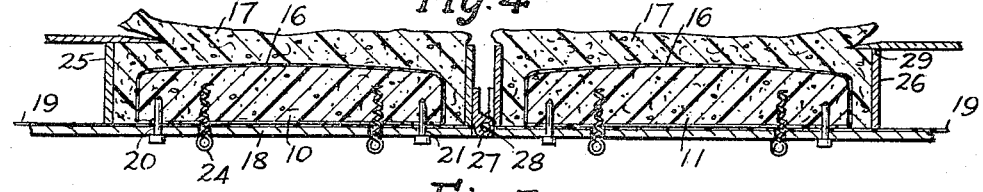
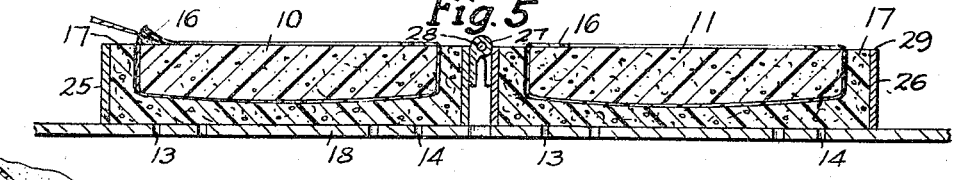
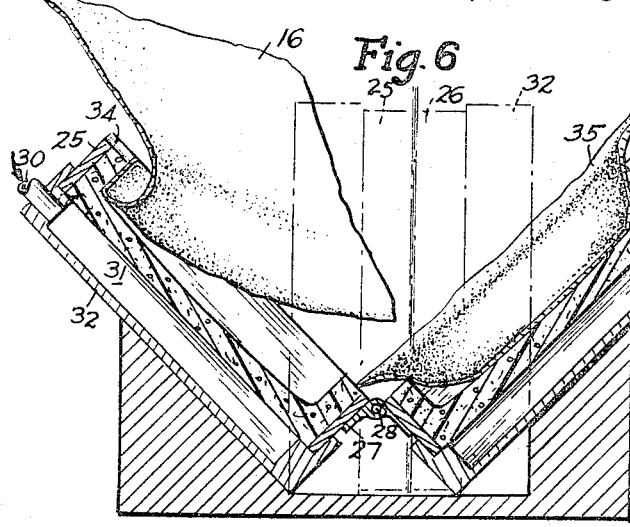
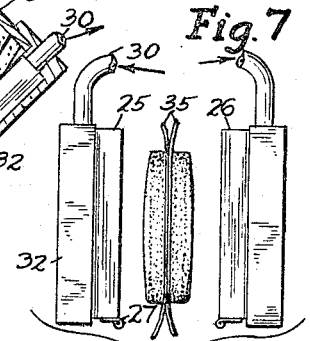
INVENTOR.
Seymour Pincus
Edwin G. Krakouer
BY
Harry Jacobson
ATTORNEY United States Patent Office 3,325,861
Patented June 20, 1967

3,325,861
MOLD FOR CASTING POLYURETHANE
ARTICLES
Seymour Pincus, Brooklyn, and Edwin G. Krakauer, Roslyn Heights, N.Y., assignors to Kay Manufacturing Corporation, Brooklyn, N.Y., a corporation of New York
Filed Apr. 2, 1964, Ser. No. 356,802
7 Claims. (Cl. 18—5)

This invention relates to light weight breathable split molds and particularly to the type made largely of non-metallic materials but intended for repeated use in the casting of foamed plastic articles.

In our copending application Ser. No. 226,839, now Patent No. 3,187,069, we have disclosed a method of making one shot polyurethane foam articles including the lining of a mold cavity with a mold release liner, applying suction or vacuum to the sheet liner to conform it to the shape of, and to hold it to the wall of the mold cavity and after expanding the foaming ingredients in the cavity until they reach the non-flowing but fragile gel state, removing the liner and its contents as a unit from the cavity to a curing oven while aiding the detachment of the liner from the cavity by the application of air pressure to the liner.

The present invention is directed to the provision of a breathable split mold in which the aforesaid casting method of our copending application is effectively carried out, which mold is not limited to the making of articles of any particular shape, which is light in weight, which is economically made by a rapid and relatively inexpensive method and of relatively inexpensive materials and which need not be resistant to the curing temperatures of the casting, but which is heat insulating.

The invention is further directed to the manufacture of molds intended for use in making articles dimensioned and shaped to meet special requirements of individual customers, rather than for quantity production of standard goods which are duplicates in shape, dimensions and materials.

The invention is further directed to the provision of a mold having an acceptably smooth-walled cavity for use with a pattern which may or may not be made with the draft frequently necessary to enable the removal of castings from ordinary molds, nor need the pattern necessarily have a smooth outer surface, the mold being so constructed that uniformly distributed fluid pressure can be exerted therethrough upon the release liner enclosing the uncured casting of one shot polyurethane foam to loosen it from the walls of the mold cavity so that the casting may be withdrawn in a gel state without damage thereto.

The invention is further directed to the provision of a mold made largely of semi-rigid polyurethane foam having a substantial percentage of open cells, readily shaped to provide a mold cavity conforming to the pattern of an article, and associated with a conduit for the movement of fluid such as air or gases into and out of the cavity.

The various objects of the invention will be clear from the description which follows and from the drawings, in which:

FIG. 1 is a perspective view of a polyurethane foam pattern with straight or parallel opposite side walls free of draft or taper and of the size and shape of a cushion which may be cast in the mold.

FIG. 2 is a perspective view of one of the finished mold halves as it appears when withdrawn from its enclosing and forming flask.

FIG. 3 is a vertical sectional view of one form of the mold flasks and of a split form of the pattern arranged for the casting therebetween of the mold filling material.

FIG. 4 is a similar view of the same showing the expanded foam of the mold cured enough for trimming and being levelled off.

FIG. 5 is a similar view of the same showing the mold inverted and the film around the pattern being trimmed.

FIG. 6 is a similar view of the completed mold with the pattern removed and the film on the cavity walls being peeled off and with the vacuum-pressure applying means attached to the mold halves ready for casting articles therein, the liner sheet being shown arranged in position for shaping into contact with the cavity walls and a sprue hole made in the mold at the parting line, the closed position of the mold being shown in dash-dot lines.

FIG. 7 is a similar exploded view of the opened and disassembled mold showing the cast article and its liner envelope being separated from the mold while the casting is in an uncured gel state ready for transportation to a curing station.

Assuming that a relatively small quantity, such as several hundred one-shot polyurethane foam articles of the cushion type are to be made in the mold, the split pattern of the precise shape and dimensions of the desired article as shown in FIG. 1 is first made and then split into the parts or halves 10 and 11 each having a preferably planar parting surface as 12 normally meeting the corresponding parting surface of the other pattern part. The mating parts 10 and 11 are provided with aligning holes 13 and 14 arranged to receive the aligning pins 15 and extending outwardly from the parting surface of each of said pattern parts into the interior of the pattern. While the pattern may be made of any suitable material customarily used for making mold patterns, it is preferred, since the pattern is in many cases, used only once to make the permanent mold cavity, that the pattern be made as quickly and inexpensively as possible.

We have found that a block of suitable light weight material such as balsam wood or substantially rigid foamed polyurethane is well adapted for the pattern. Such polyurethane is of well known composition and is made in a well known manner from ingredients now commercially sold and readily obtainable and which need not be described in detail. The block of plastic, balsam wood or the like is easily cut or otherwise trimmed to the proper size and shape, but contrary to the usual practice, no draft is necessary in the pattern sides, but the opposite sides could be allowed to remain as in the usual furniture cushions, when such cushions are to be cast in a no-draft mold.

Each of the pattern halves is covered except at the parting surface thereof with a suitable film 16 preferably adherent to the mold material 17 but releasable from the pattern. The film may be in the form of an initially solid flexible sheet of heat-shrinkable plastic treated on one face thereof to roughen it and to make it adherent at that face to the mold material. The treatment is similar to that for printability as by abrasion, etching, electrostatic treatment, flame treatment or the like. An example of such film or sheet is the vinyl-vinylidine chloride shrink film made by Reynolds Metals Company of Grottos, Va., and sold under the trademark "Reynolon." Other known types of heat-shrinkable film are composed of polyethylene, polypropylene and the like.

The film is wrapped tightly around the outer surface of each pattern part and suitably secured to the parting surface 12 thereof (FIGS. 3 and 4) as by means of pressure sensitive tape or the like, and is shrunk tightly on to the pattern surface at an elevated temperature. As the film shrinks on to the pattern, it forms a relatively smooth hard outer surface thereon and insures the formation of a similar smooth surface on the walls of the mold cavity. Instead of a solid film in sheet form, the film may be formed in place on the surface of the pattern by coating the surface with a liquid such as a water based flexible vinyl dispersion which sets by the evaporation of the water to leave a skin or film on the surface. The liquid envelope #15–10 made by the Better Finishes and Coatings Division of Essex Chemical Corp. of Clifton, N.J., is an example of a suitable dispersion in water. The coating which forms the film may, if desired, be in the form of a solution in organic solvents.

Should a solid shrink film be employed to cover the pattern, then the surface of the bare pattern need not necessarily be unduly smooth for the reason that the film bridges slight irregularities in the surface. However, in the case of the film-forming liquid coating, an undercoat should first be applied to the bare surface of the pattern if said surface is not already smooth, to make certain that the final film-forming coating dries into a smooth surface. The undercoat should form a smooth and hard surface and consequently the pattern material should be non-absorbent thereof.

When a split pattern is used in making the mold, each pattern part is film coated to put it in condition to be placed within a suitable molding flask. FIG. 3 illustrates one way of arranging the pattern parts and flasks. The parts 10 and 11 are placed with the parting surfaces 12 thereof on the horizontal supporting platen 18, the upper surface of which carries a suitable mold release agent such as either the thin sheet of polyethylene 19 or other waxy release coating or film. Holes as 20, 21 through the platen 18 and sheet 19, registering respectively with the holes 13, 14 in the pattern parts, receive the removable aligning pins 15, while additional holes 23 in the platen permit the passage therethrough and into the interior of the pattern parts of suitable fastening means such as the headed wire screws 24, similar to cork screws, to hold said parts in place during the casting operation. The next step shown in FIG. 3 in the process of making the mold is to surround or enclose both parts of the pattern, except at the top end surface thereof opposite the parting planes, with the box-like mold flasks 25, 26 each of which in the form shown, has four vertical walls and is open at the top and bottom. Preferably, the flasks are mounted to swing about a common pivot, as by being suitably hinged together, the hinge 27 shown having the removable hinge pin 28. The flask walls are spaced a sufficient distance outwardly from the pattern part received therein to form the mold filling material 17 of the desired strength and thickness. The mold filling material is preferably light in weight, heat-insulating and flexible until set and hardened and is porous and breathable, meaning that it is pervious to the passage of fluids such as gas and air, in any direction. The material 17 is also inexpensive and incapable of resisting the curing temperatures of one shot polyurethane foam. Various inorganic or mineral substances can be employed if desired even though they are capable of resisting said curing temperatures, if they are breathable or can be made breathable. Because of its low cost and ease of manipulation, the mold filling material preferred is of the semi-rigid polyurethane foam type such as the P502 ingredients commercially sold under the trademark "Nopco" by Nopco Chemical Co. of Newark, N.J.

The ingredients in liquid form are poured into the space between the flasks 25, 26 and the pattern parts and permitted to expand until the resulting foam reaches or passes the top edges 29 of the flasks and sets hard enough to be cut. Said ingredients being self curing, the assembly of mold material, flasks and pattern are allowed to remain undisturbed until the foam has set before the excess foam is trimmed off to form a flat surface at the top of each flask as shown in FIG. 4.

To remove the pattern parts and thereby to expose the mold cavity, the screws 24 and the pins 15 are removed from the patern parts 10 and 11, and the flasks 25, 26 together with the contents thereof are inverted into the position of FIG. 5. That part of the film 16 which does not adhere to the walls of the mold cavity but extends therepast, regardless of how it is formed or applied, is trimmed off exactly at the junction of the parting surface 12 with the cavity wall and the excess film, if any, which projects inwardly on to the parting surface of the pattern, is discarded as shown in FIG. 5 in connection with the hinged flasks. It will be understood that the trimming or cutting of the film at the parting line is for the purpose of releasing the pattern therefrom and is not affected by different arrangements of the flasks, whether hinged or separate, if there is such excess film to be trimmed.

After such trimming, the pattern parts may easily be lifted out of the respective molds by reason of the release characteristics of the film 16, which preferably remains adhering to the cavity walls but not to the pattern. After removal of the pattern, the film 16 is gently stripped or peeled off the walls of the cavity without significant damage to said walls in order to make said walls breathable, as shown in connection with the flask 25 in FIG. 6. Should it be found desirable to have the film remain in place on the cavity wall, said wall including the film is treated to make it pervious to fluids as by puncturing the film at a number of places. Since a skin usually forms at the parting surface of the mold members 17, it is advisable also to make such surface breathable in any suitable manner as by abrasion.

While FIG. 3–5 show one way of making the mold members 17, the relative arrangement of the flasks, pattern and the supports therefor may vary to a considerable extent while utilizing generally the above steps of making the mold. For example, the pattern need not necessarily be split. In that case, the flasks 25, 26 also need not be separated during the casting of the mold members 17. Instead, the complete pattern is suspended by suitable wires or the like arranged to pass through and to project beyond the pattern and preferably beyond the flasks or fastened thereto and lying preferably in the general plane of the parting surfaces of the flasks. Either flask such as 26 is superimposed upon and registers with the other or lower flask 25 as by swinging the flask about the hinge 28 in the proper direction or merely setting one flask upon the other in any other suitable way. One flask surrounds the upper part of the pattern, the other flask surrounding the lower part of the pattern and being closed at its bottom as by the platen 18. The closed flask, pattern and platen are tilted as a unit to permit the pouring of the foam forming ingredients into the lowermost corner of the closed flask. The liquid ingredients having been poured into the corner, the open end of the upper flask is covered while the foam continues to expand, the flasks being turned upward at the proper time to attain correct expansion of and filling of the mold with foam.

After the foam has cured sufficiently, the hardened foam material is cut through at the parting line, and the shrink film or coating film 16 is also cut or scored sufficiently to part when the flasks are swung open or separated with the foam filling material 17 adhering thereto. The pattern is thereby released from at least one of the mold members and is then removed from the other. The film 16 is peeled off or the cavity wall including said film is made breathable as hereinbefore explained. In the case of a film non-adherent to the pattern or the foam or removable from the cavity walls with the pattern, the cavity wall itself is made breathable by abrading or otherwise treating the skin thereon in a suitable manner as above described.

Means are provided for conducting air or other suitable fluid under pressure to the interior of the breathable mold material and for evacuating air and gases from the cavity when the mold is in use. As shown, said means comprises the conduit or pipe 30 secured to the chamber 31 carried by the mold cover 32 and communicating with the mold member 17. The cover 32 is shown in the form of a box having relatively narrow sides 33 adapted to fit over the flask 25 or 26 when the mold is in use as shown in FIG. 6.

Before the mold is used, a suitable sprue opening is made therein to permit the escape of air and gases from the mold cavity. As shown in FIG. 6, such opening as 34 should be at the parting line of the mold halves. With the completed assembled mold in the open position shown in FIG. 6 and with the walls of the mold cavity made breathable, the mold is complete and ready for use in casting the desired foam article therein.

In use, the walls of the mold cavity are lined with a mold release liner 35 comprising a stretchable thin polyethylene sheet which is laid over said walls. The application of such suction through the conduits 30 stretches and shapes the liner to the shape of the cavity and holds it in position against the cavity walls tightly during the insertion into that part of the mold in the correct tilted position to receive them, of the one shot foam-forming polyurethane ingredients. The mold is closed by moving the halves together into the dash-dot line position of FIG. 6 and the foam is permitted to expand until the gases have escaped through the sprue opening 34 and the cavities are filled with foam as will be indicated by the discharge of foam through the sprue opening.

When the foam has gelled, the mold is opened and separated from the release liner, the separation being aided by the application of fluid pressure to the liner by fluid passing through the member 17 and pressing against the liner which had adhered to the foam (see FIG. 7 indicating the complete separation). The liner and its foam gel contents are then moved, while supported if necessary in a suitable manner, to a curing station and the process repeated for the next casting.

It has been found that polyurethane foam has many advantages over other materials whether in the form of a filler cast directly into a flask to form the mold, or whether in the form of FIG. 2 as a pre-form to be replaceably inserted into a flask or as a mold core. Not the least of the advantages is its heat-insulating characteristic, which serves to maintain the temperature of the foaming ingredients against substantial change by conduction of heat away therefrom during the reaction thereof such as would occur with heat-conducting mold materials.

While the description herein has been directed primarily for purposes of illustration to a split mold, it will be understood that the shape and arrangement of the mold and pattern illustrated may vary greatly provided that suction and pressure can be applied to the release liner wherever used in the mold whether the mold is split or not and whether cored or not.

It will now be seen that we have provided a light weight inexpensive breathable mold and a method of making such mold which makes it possible economically to cast a limited or even a large quantity of polyurethane foam articles in any of the numerous special shapes often required by customers and that the various objects of the invention have been adequately attained.

While certain specific forms of the invention have herein been shown and described, various obvious changes may be made therein without departing from the spirit of the invention defined by the appended claims.

We claim:

1. A reusable molded mold for casting foamed plastic articles comprising a mold member of non-metallic foam material incapable of withstanding the curing temperatures of said articles and permeable to gases and having a mold cavity therein open at one end part thereof, and enclosing and supporting means for the member in contact with the major part of the areas of the surfaces of said member other than the cavity walls when the mold is closed, to cut off communication of the interior of said member with the atmosphere at the interface of said member and said means, said means including a conduit for controlled air flow communicating with the interior of said member, a box-like flask in contact with the side walls of said member and a box-like conduit-carrying element associated with and removable from and supporting the flask.

2. A reusable molded mold for casting foamed plastic articles comprising a mold member of non-metallic foam material incapable of withstanding the curing temperatures of said articles and permeable to gases and having a mold cavity therein open at one end part thereof, and enclosing and supporting means for the member in contact with the major part of the areas of the surfaces of said member other than the cavity walls when the mold is closed, to cut off communication of the interior of said member with the atmosphere at the interface of said member and said means, said means including a conduit for controlled air flow communicating with the interior of said member, semi-rigid polyurethane foam having open cells therein, the enclosing and supporting means including a box-like flask in contact with the side walls of said member, the flask preventing the entrance into and the discharge of fluid from said cavity at said interface, and a solid flexible non-metallic sheet of substantially uniform thickness non-adherent to the wall of the cavity and shaped to the contour of, and in firm contact with the wall of the cavity, and serving to form a smooth surface on said wall on and after the withdrawal of air through said conduit from the cavity, and serving further to aid in the release and withdrawal from the mold member without damage of an uncured polyurethane foam article in the gel state molded in said cavity when air is introduced through said conduit and through said open cells against the surface of the sheet which is in contact with the wall of the cavity.

3. A reusable split molded mold for casting a polyurethane foam article therein comprising a pair of separable mating flasks each open at both ends thereof and each having side wall of substantial height and having a parting surface at one end thereof mating with the parting surface of the other flask, an open celled polyurethane foam mold member in contact with the inner walls of each of the flasks, each of the members having a mold cavity therein adapted to mate with the cavity of the other member when the mold is closed, each cavity extending from the parting surface of the enclosing flask toward the other end of the flask, means normally closing said other end of each flask, means for conducting fluid under pressure to the interior of each mold member and each cavity and for exhausting fluid therefrom and a solid flexible non-metallic sheet in firm contact with and conforming to the shape of the walls of the cavity on and after the exhaustion of fluid therefrom and releasable from said walls on the passage of fluid under pressure through the conducting means for the fluid and through the member and against the sheet.

4. A breathable split mold having a cavity therein for casting a one shot polyurethane foam article and for releasing the article while said article is still in a gel state, the mold comprising a pair of mating mold members each having part of the entire mold cavity therein and each also having a parting surface mating with the parting surface of the other mold member, the walls of the cavity being permeable to gases moving into and out of the cavity through said members and means communicating with the members for conducting gases to and from the cavity, and a solid flexible non-metallic sheet impermeable to fluid in contact with and conforming to the contour of the cavity walls during the movement of gases through said means out of the cavity.

5. A molded mold having a cavity therein for casting an article made of one shot polyurethane foam and for releasing the article while said article is still a foam gel, the mold having walls of semi-rigid polyurethane foam, the foam having a substantial percentage of open cells therein and being thereby permeable to gases, the mold having a cavity therein communicating with the atmosphere outside of the mold through said walls and a conduit associated with said walls for conducting gases alternately toward and from the cavity.

6. The molded mold of claim 5, and a solid flexible non-metallic sheet of substantially uniform thickness non-adherent to the wall of the cavity and shaped to the contour of, and in firm contact with, the wall of the cavity, and serving to form a smooth surface on said wall on the withdrawal of gas through said conduit from the cavity and to aid in the release and withdrawal from the mold member without damage, of an uncured polyurethane foam article in the gel state which is molded in said cavity, on the introduction of air through said conduit and through said open cells against the surface of the sheet which is in contact with the wall of the cavity.

7. A molded, reusable, light-weight, non-metallic mold for molding foamed polyurethane articles, comprising a mold member of foam material having a substantial number of open cells therein, said material being permeable to gases and incapable of withstanding the curing heat for said articles and being substantially non-conductive of the reaction heat of the articles foamed in said member, said member having a mold cavity therein, and relatively rigid enclosing and supporting means for said member in contact with the major part of the exterior surface areas of said member cutting off communication between said areas and the atmosphere at the interface of said means and said areas and thereby preventing the entrance into and the discharge from said cavity of fluid at said interface, and a solid, flexible sheet of uniform thickness having a smooth surface constituting a mold release agent, said surface being in removable contact with, and conforming to the shape of the cavity walls on and after withdrawal of gases from the cavity through the remaining selected areas of the mold member free of said means, said sheet being adapted to aid in the release from the member without damage of an article of uncured polyurethane foam in the gel state with said sheet attached thereto, on the introduction of air through said selected remaining areas to the interface of said sheet and the walls of the cavity, the other surface of said sheet being sufficiently adherent to adhere permanently to the adjacent surface of the polyurethane foam during the molding of said foam in the cavity.

References Cited

UNITED STATES PATENTS

| | | | |
|---|---|---|---|
| 1,698,836 | 1/1929 | Bartley et al. | 249—170 XR |
| 3,003,190 | 10/1961 | Macks | 18—45 XR |
| 3,183,289 | 5/1965 | Leavesley | 264—220 |

J. SPENCER OVERHOLSER, *Primary Examiner.*

E. MAR, *Assistant Examiner.*